United States Patent Office

E. C. MALTBY AND EDWARD SMITH, OF NORTHFORD, CONNECTICUT.

Letters Patent No. 66,158, dated June 25, 1867.

IMPROVED CONFECTION.

*The Schedule referred to in these Letters Patent and making part of the same.*

TO ALL WHOM IT MAY CONCERN:

Be it known that we, E. C. MALTBY and EDWARD SMITH, of Northford, in the county of New Haven, and State of Connecticut, have invented a new and improved Confection; and we do hereby declare that the following is a full, clear, and exact description thereof, which will enable others skilled in the art to make and use the same.

This invention consists in preparing the meat of cocoa-nut so that the same may be preserved and kept an indefinite period and used at any time for pies, puddings, &c., &c.

At present, in order to prepare pies and puddings from cocoa-nut meat, the latter is grated while in a green state, and it is necessary to use it immediately, as it soon becomes acid and worthless. By our invention the cocoa-nuts may be purchased in large quantities, when there is an ample supply in the market, and consequently at a moderate cost, and the meat prepared so that it may be sold in quantities at a reasonable price and fair profit, and be fit for use at any time.

We prepare the cocoa-nut meat as follows: The meat is taken out of the shell, the rind or exterior surface removed, and then grated by means of a rotary or other grater. The grated meat has sugar added to it, about twenty pounds of sugar to sixty pounds of meat, and it is then spread out in pans about one inch thick, and the pans placed in a kiln or suitable oven, in order to evaporate the moisture contained in the meat. The pans in which the meat is dried should be of copper or galvanized iron; the latter material would be the cheapest, and probably will be used for the purpose.

Having thus described our invention, we claim as new, and desire to secure by Letters Patent—

A new and useful confection composed of the meat of the cocoa-nut, prepared in the manner substantially as herein set forth.

The above specification of our invention signed by us this 13th day of May, 1867.

E. C. MALTBY,
EDWARD SMITH.

Witnesses:
GEO. E. TREADWELL,
GEO. H. WATROUS.